United States Patent
Chan et al.

(10) Patent No.: US 7,450,337 B2
(45) Date of Patent: Nov. 11, 2008

(54) APPARATUS AND METHOD FOR GUIDING BYPASS REENTRY FLOW THROUGH CONTRACTION AND FILTER IN A HARD DISK DRIVE

(75) Inventors: Andre Chan, Milpitas, CA (US); Michael Hatchett, San Jose, CA (US); Ferdinand Hendriks, Morgan Hill, CA (US); Jr-Yi Shen, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 350 days.

(21) Appl. No.: 10/956,460

(22) Filed: Sep. 30, 2004

(65) Prior Publication Data

US 2006/0066992 A1   Mar. 30, 2006

(51) Int. Cl.
G11B 33/14   (2006.01)
G11B 25/04   (2006.01)
(52) U.S. Cl. .................................................. 360/97.02
(58) Field of Classification Search ............... 360/97.01, 360/97.02, 97.03, 97.04
See application file for complete search history.

(56) References Cited

U.S. PATENT DOCUMENTS

| | | | | |
|---|---|---|---|---|
| 4,489,356 A | * | 12/1984 | Farmer | 360/97.02 |
| 4,710,830 A | * | 12/1987 | Imai et al. | 360/97.03 |
| 5,212,679 A | * | 5/1993 | Tohkairin | 720/648 |
| 6,238,467 B1 | * | 5/2001 | Azarian et al. | 96/135 |
| 6,369,977 B1 | * | 4/2002 | Imai et al. | 360/97.02 |
| 6,449,119 B1 | * | 9/2002 | Hashizume et al. | 360/97.03 |
| 6,462,901 B1 | * | 10/2002 | Tadepalli | 360/97.03 |
| 6,542,328 B2 | * | 4/2003 | Harrison et al. | 360/97.03 |
| 6,654,201 B2 | * | 11/2003 | Smith | 360/97.02 |
| 6,728,062 B1 | * | 4/2004 | Ou-Yang et al. | 360/97.02 |
| 6,788,493 B1 | * | 9/2004 | Subramaniam et al. | 360/97.02 |
| 6,900,962 B1 | * | 5/2005 | Forbord | 360/97.02 |
| 7,057,851 B2 | * | 6/2006 | Sun et al. | 360/97.02 |
| 2002/0039253 A1 | * | 4/2002 | Imai et al. | 360/97.02 |
| 2002/0181149 A1 | * | 12/2002 | Shimizu et al. | 360/97.03 |
| 2003/0151847 A1 | * | 8/2003 | Tsang et al. | 360/97.02 |
| 2003/0156352 A1 | * | 8/2003 | Voights et al. | 360/97.02 |
| 2004/0252405 A1 | * | 12/2004 | Sun et al. | 360/97.02 |
| 2005/0270692 A1 | * | 12/2005 | Adams et al. | 360/97.02 |

* cited by examiner

Primary Examiner—Andrea Wellington
Assistant Examiner—Jason M Garr (57) ABSTRACT

An apparatus and method for guiding bypass reentry flow through contraction and filter in a hard disk drive. The method provides a bypass channel for directing airflow away from a first portion of a disk of the hard disk drive and toward a second portion of the disk of the hard disk drive. A contraction portion is coupled with the bypass channel at a location wherein the bypass channel directs the airflow back toward the second portion of the disk of the hard disk drive. The contraction portion accelerates a first portion of the airflow directed toward the second portion of the disk of the hard disk drive. A filter portion integral with the contraction portion is utilized for filtering a second portion of the airflow directed toward the second portion of the disk of the hard disk drive.

17 Claims, 7 Drawing Sheets

APPARATUS AND METHOD FOR GUIDING BYPASS REENTRY FLOW THROUGH CONTRACTION AND FILTER IN A HARD DISK DRIVE

TECHNICAL FIELD

The present invention relates to the field of hard disk drives, and more particularly to an apparatus and method for guiding bypass reentry flow through contraction and filter in a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPMs) can be achieved. For example, it is not uncommon for a hard disk drive to reach speeds of 15,000 RPMs. This second refinement provides weight and size reductions to the hard disk drive, it also provides a faster read and write rate for the disk thereby providing increased speed for accessing data. The increase in data acquisition speed due to the increased RPMs of the disk drive and the more efficient read/write head portion provide modern computers with hard disk speed and storage capabilities that are continually increasing.

However, the higher RPMs of the disk has resulted in problems with respect to the interaction of the air with components of the hard disk drive. For example, although the hard disk drive is closed off from the outside, it has an amount of air within its packaging. As the disk spins and the RPMs increase, the air within the hard disk drive package will also begin to rotate and will eventually approach the speed at which the disk is rotating especially near the spindle hub and disk surfaces. This is due to the friction between the disk and the air. In general, Reynolds numbers are used to represent the flow characteristics. For example, in one case the Reynolds number may be based on the tip speed of the disk. That is, the linear velocity at the outer diameter of the disk.

Only when the Reynolds number is sufficiently small (e.g., an enclosure with reduced air density), the air may stay in laminar flow with the boundary layer of air remaining smooth with respect to the rotating disk. However, any obstructions to the flow will result in turbulence. That is, due to the introduction of obstructions to the airflow, the airflow will become turbulent as it passes the obstruction.

As is well known from fluid mechanics, the characteristics of turbulent airflow can include buffeting, harmonic vibration, and the like. Each of these characteristics will result in problematic motion for the arm and head portion and/or the rotating disk. The problematic motion will result in excessive track misregistration. This is even more significant as the tolerances are further reduced.

A second problem also occurs due to the increasingly tighter tolerances of the hard disk drive. For example, particle matter in the air can be detrimental to the operation of the hard disk drive. That is, since the head portion of the hard disk drive is located so close to the disk, even the slightest particle in the air can cause the head portion to destructively interact with the track it is reading from or writing to. Therefore, a filter is necessary to remove the detrimental particles from the airflow.

One solution to the airflow problem has been the replacement of the air within the hard disk drive package. In some cases, the air is replaced with gases such as Helium that significantly lower the Reynolds number of the drive. A second solution has been the partial removal of the air within the hard disk drive package. Both solutions require significant structural and material changes with respect to the shell of the hard disk drive package. Additionally, the costs associated with the structural and material changes and the manufacturing requirements are extremely prohibitive.

SUMMARY

An apparatus and method for guiding bypass reentry flow through contraction and filter in a hard disk drive is disclosed. The method provides a bypass channel for directing airflow away from a first portion of a disk of the hard disk drive and toward a second portion of the disk of the hard disk drive. A contraction portion is coupled with the bypass channel at a location wherein the bypass channel directs the airflow back toward the second portion of the disk of the hard disk drive. The contraction portion accelerates a first portion of the airflow directed toward the second portion of the disk of the hard disk drive. A filter portion integral with the contraction portion is utilized for filtering a second portion of the airflow directed toward the second portion of the disk of the hard disk drive.

BEST MODES FOR CARRYING OUT THE INVENTION

Reference will now be made in detail to the alternative embodiment(s)s of the present invention, an apparatus and method for guiding bypass reentry flow through contraction and filter for a hard disk drive. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
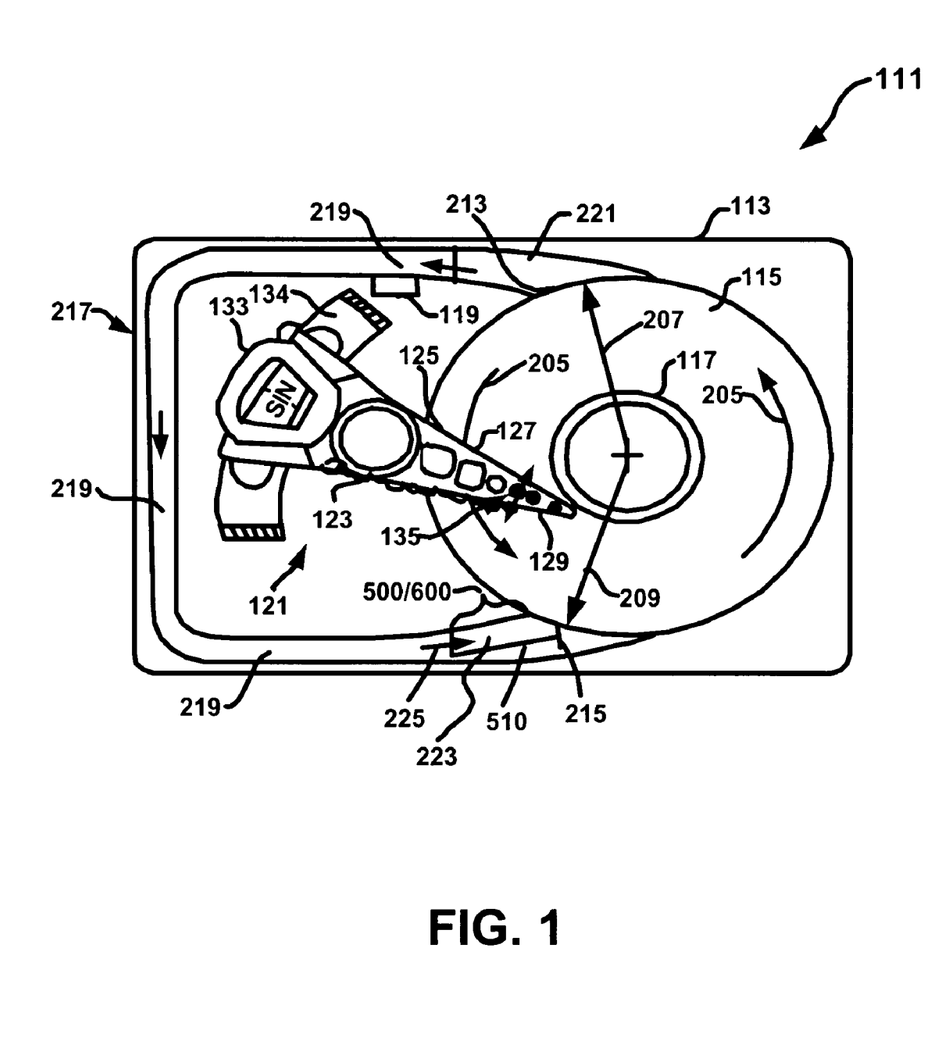
FIG. 1 is a schematic, top plan view of a hard disk drive in accordance with one embodiment of the present invention.

With reference now to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. The disk or disks 115 are rotated (see arrows 205) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be of "femto" size (approximately 850×700×230 microns) and is pre-loaded against the surface of disk 115 (in the range two to ten grams) by suspension 127.

Suspensions 127 have a spring-like quality, which biases or urges the air-bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 4:
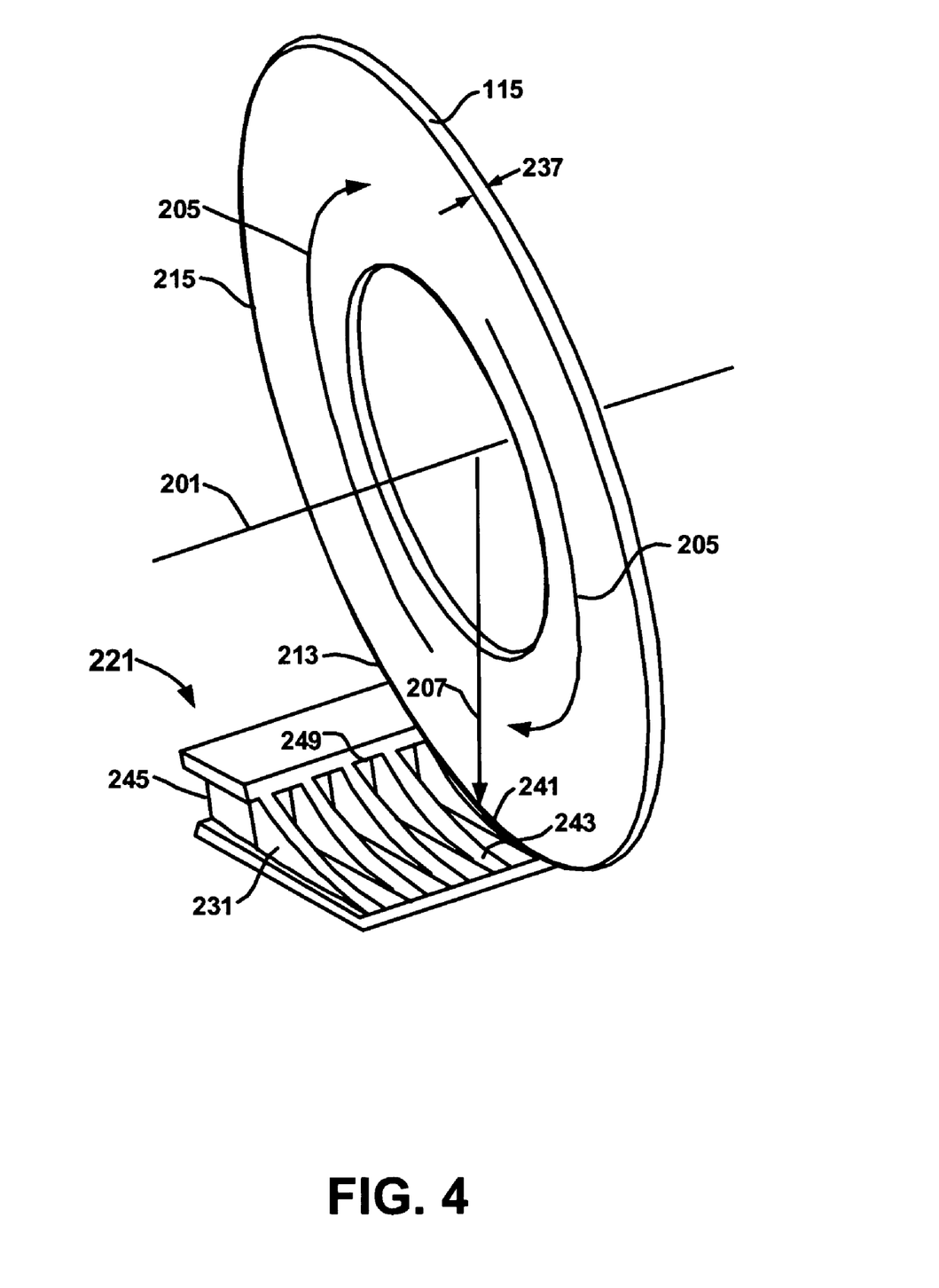
FIG. 4 is a front isometric view of the diffuser of FIG. 2 showing one of the adjacent disks in accordance with one embodiment of the present invention.

Referring now to FIGS. 1 and 4, the disk pack and disks 115 (one shown) define an axis 201 of rotation 205 and radial directions 207, 209, relative to the axis 201. The disk pack and disks 115 have a downstream side 213 wherein air flows away from the disks 115, and an upstream side 215 wherein air flows toward the disks 115. The drive 111 also has a bypass channel 219 formed in the housing 113 for directing the airflow generated by rotation of the disks 115 from the downstream side 213 of the disk pack or disks 115 to the upstream side 215 of the disk pack or disks 115. In the embodiment shown, the bypass channel 219 is located between an outer perimeter 217 (FIG. 1) of the housing 113 and the actuator 121, such that the bypass channel 219 completely circumscribes the actuator 121. In some HDD designs where there is not sufficient space to implement a full bypass channel (shown) the bypass channel 219 may be interrupted (not shown). This is known as a partial bypass. When there is a partial bypass, the presence of a diffuser and contraction remains beneficial. Furthermore, in order to help the bypass flow negotiate substantial angular changes (channel bends), one or more turning vanes may be placed in those areas. The use of turning vanes is well known in wind tunnel design.

As shown in FIGS. 1 through 4, one embodiment of the drive 111 constructed in accordance with the present invention also comprises a diffuser 221. In the embodiment shown, the diffuser 221 is located in the bypass channel 219 and is positioned adjacent to the downstream side 213 of the disk pack or disks 115. The diffuser 221 is also offset downstream from the disks 115 in the radial direction 207, such that the diffuser 221 reduces airflow drag from the disks 115 due to disk wake in the bypass channel 219. This type of aerodynamic drag is commonly called base drag.

Figure 5:
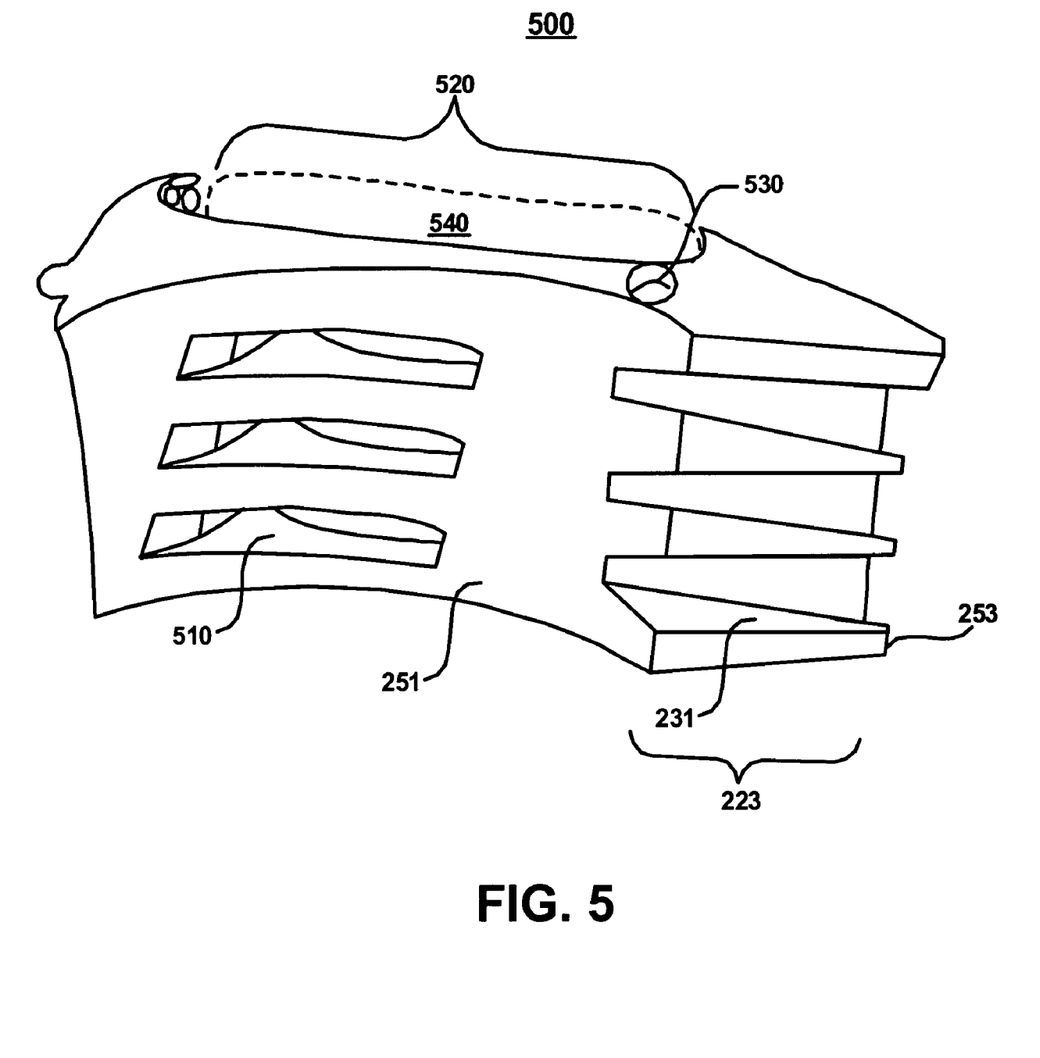
FIG. 5 is a front isometric view of a contraction and filter structure with a removable filter in accordance with one embodiment of the present invention.
Figure 6:
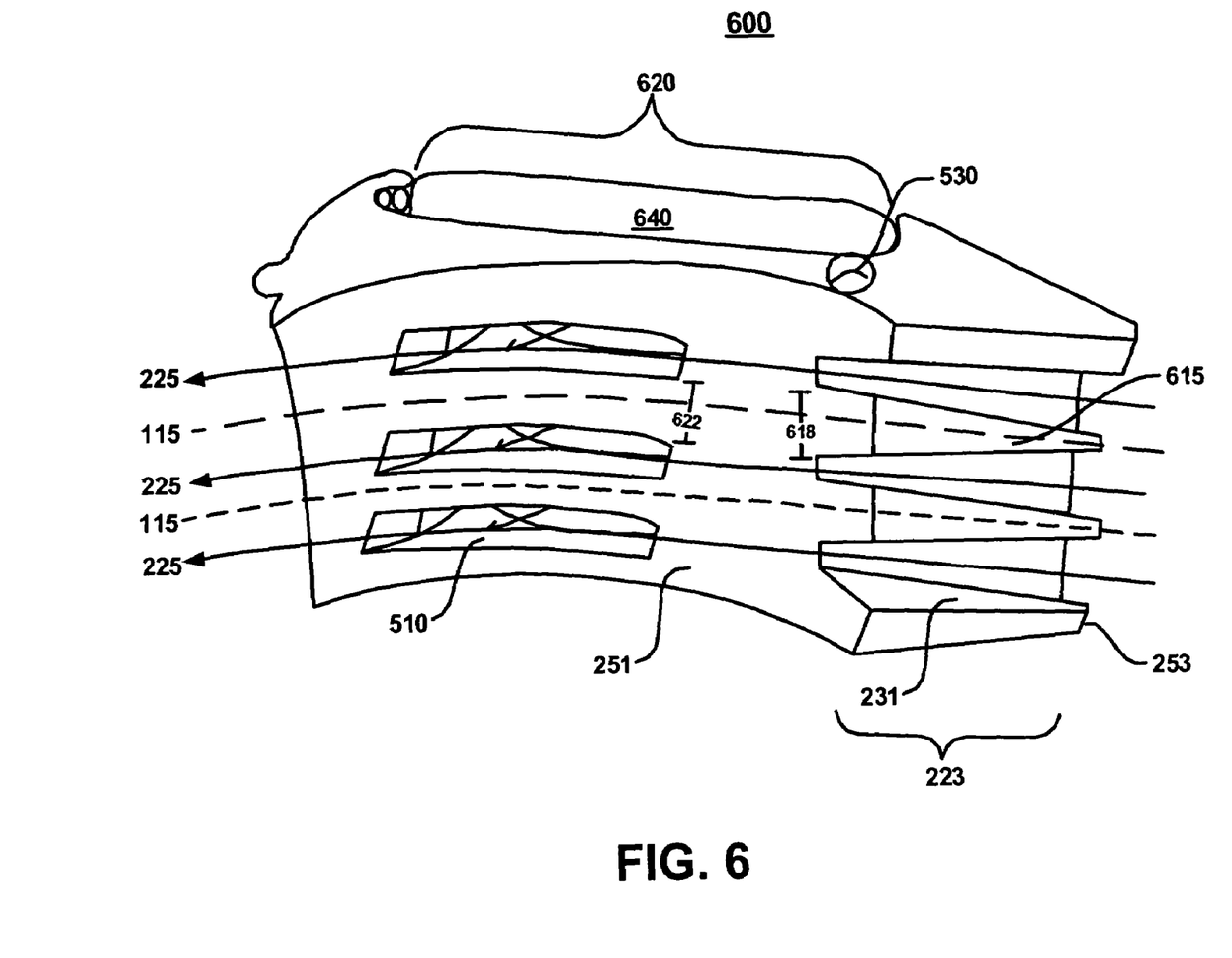
FIG. 6 is a front isometric view of the contraction and filter structure with a permanent filter in accordance with one embodiment of the present invention.

Alternatively, or operating in conjunction with the diffuser 221, another embodiment of the drive 111 may include a contraction device 500 and/or 600 (of FIGS. 5 and 6). In one embodiment, the contraction/filter device 500/600 includes a contraction 223 (e.g., a Venturi) and a filter portion (e.g., 520 or 620 of FIGS. 5 and 6). The contraction/filter device 500/600 is also located in the bypass channel 219, but is adjacent to the upstream side 215 of the disk pack or disks 115. Like the diffuser 221, the contraction/filter device 500/600 is offset upstream from the disks 115, but in a radial direction 209. Each of the diffuser 221 and the contraction/filter device 500/600 may be spaced apart from outer edges 213, 215, respectively, of the disks 115 in radial directions 207, 209, respectively, by, for example, no more than approximately 0.5 mm. The contraction/filter device 500/600 is provided for re-accelerating a slow bypass air flow 225 (FIGS. 1, 5, and 6) from the contraction 223 and the filter 520 or 620 to the disks 115 to provide efficient energy conversion for the air flow from pressure energy to kinetic energy prior to merging the slow bypass air flow 225 with air flow 205 (FIG. 1) around the disks 115.

In the embodiments illustrated, both the diffuser 221 and the contraction/filter device 500/600 are equipped with a plurality of airfoils 231. The airfoils 231 may be identical but, as shown in the illustrations, they may be configured differently as well. The airfoils 231 are axially apart from each other, respectively, in the axial direction. Each of the airfoils 231 has a generally planar orientation in the radial direction. As shown, for example, in FIG. 4, the airfoils 231 (only one shown for clarity) are axially aligned with one of the disks 115. The airfoils 231 also having a maximum axial thickness 235 (FIG. 2) that is preferably equal to an axial thickness 237 (FIG. 4) of a respective one of the disks 115. The diffuser shape must be such as to promote adherence of the flow to the surface while avoiding flow separation.

It is well known in the art that flow separation occurs when the diffuser widens too suddenly. Furthermore, it will be understood that an array of flow conditioning measures can be applied to the basic diffuser shape shown for the purpose of promoting adherence of the flow to the diffuser walls. Among these measures are turbulators consisting of surface roughness elements, for example ridges, vortex generators, boundary layer tripping devices and the like. Other flow conditioning measure is irradiation of the flow with sound. The mentioned flow conditioning techniques are known in the art of aerodynamic design.

Each of the airfoils 231 of the diffuser 221 has a leading edge 241 with a generally cylindrical transverse surface 243 extending in the axial direction that flatly faces the disks 115. Transverse surface 243 is located immediately adjacent to a respective one of the disks 115 (see FIGS. 1 and 4) and is substantially perpendicular to a planar orientation of a respective one of the disks 115. Each of the airfoils 231 of the contraction/filter device 500/600 has a trailing edge 251 located immediately adjacent to a respective one of the disks 115, and a leading edge 253 with a rounded surface that is located opposite the trailing edge 251.

The leading edges 241 of the airfoils 231 of the diffuser 221 and the trailing edges 251 of the airfoils 231 of the contraction/filter device 500/600 have arcuate contours that are complementary in shape with respect to circular outer edges 213, 215 of the disks 115. The airfoils 231 of the diffuser 221 also have trailing portions 245 located opposite the leading edges 241. The trailing portions 245 taper down in axial thickness in the air flow direction away from the disks 115 to define gradually expanding passages 249. The airflow transitions from the disks 115 to the trailing portions 245 along the tapers to gradually decrease a speed of the air flow.

Figure 2:
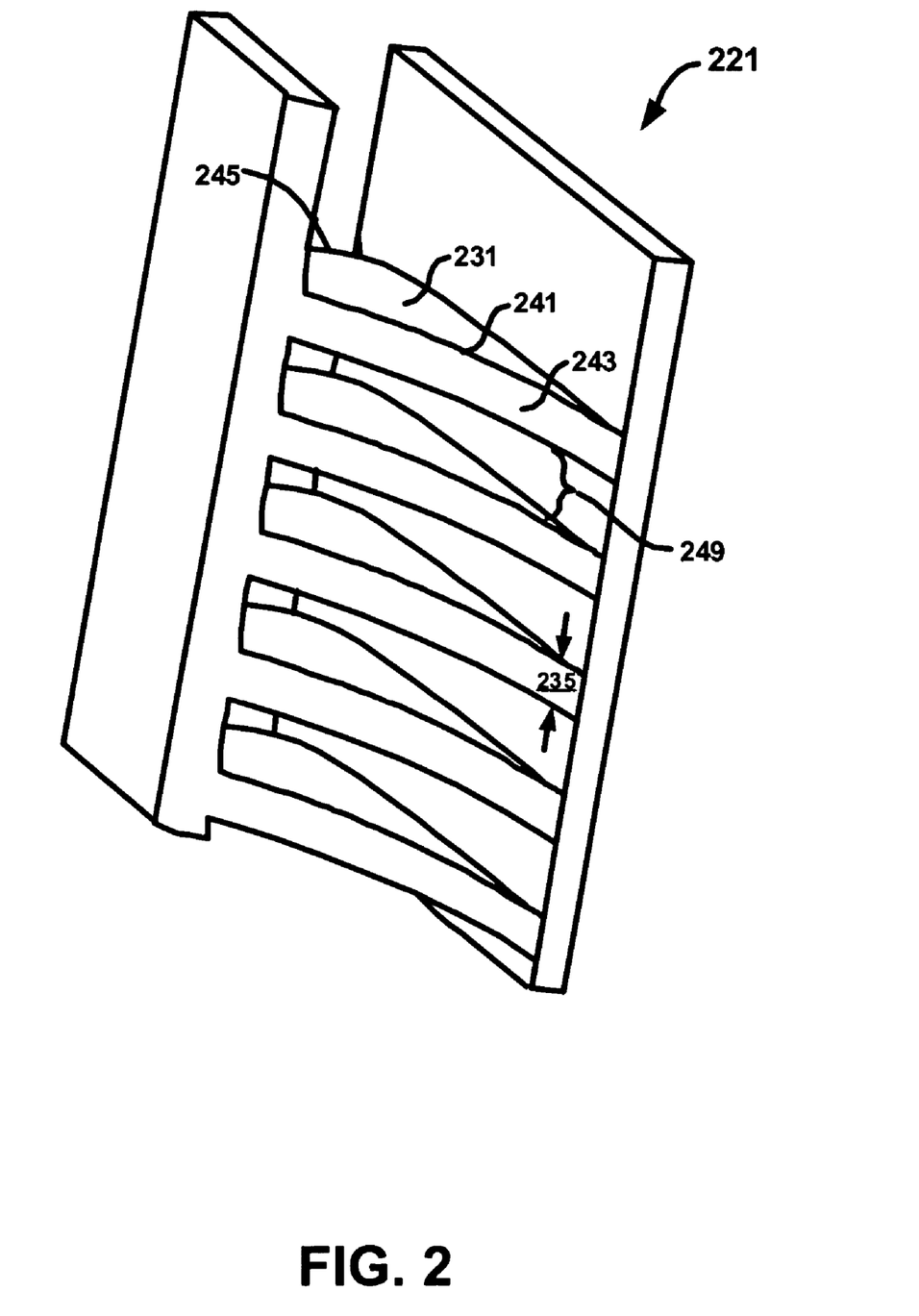
FIG. 2 is a front isometric view of a diffuser for the hard disk drive of FIG. 1 in accordance with one embodiment of the present invention.
Figure 3:
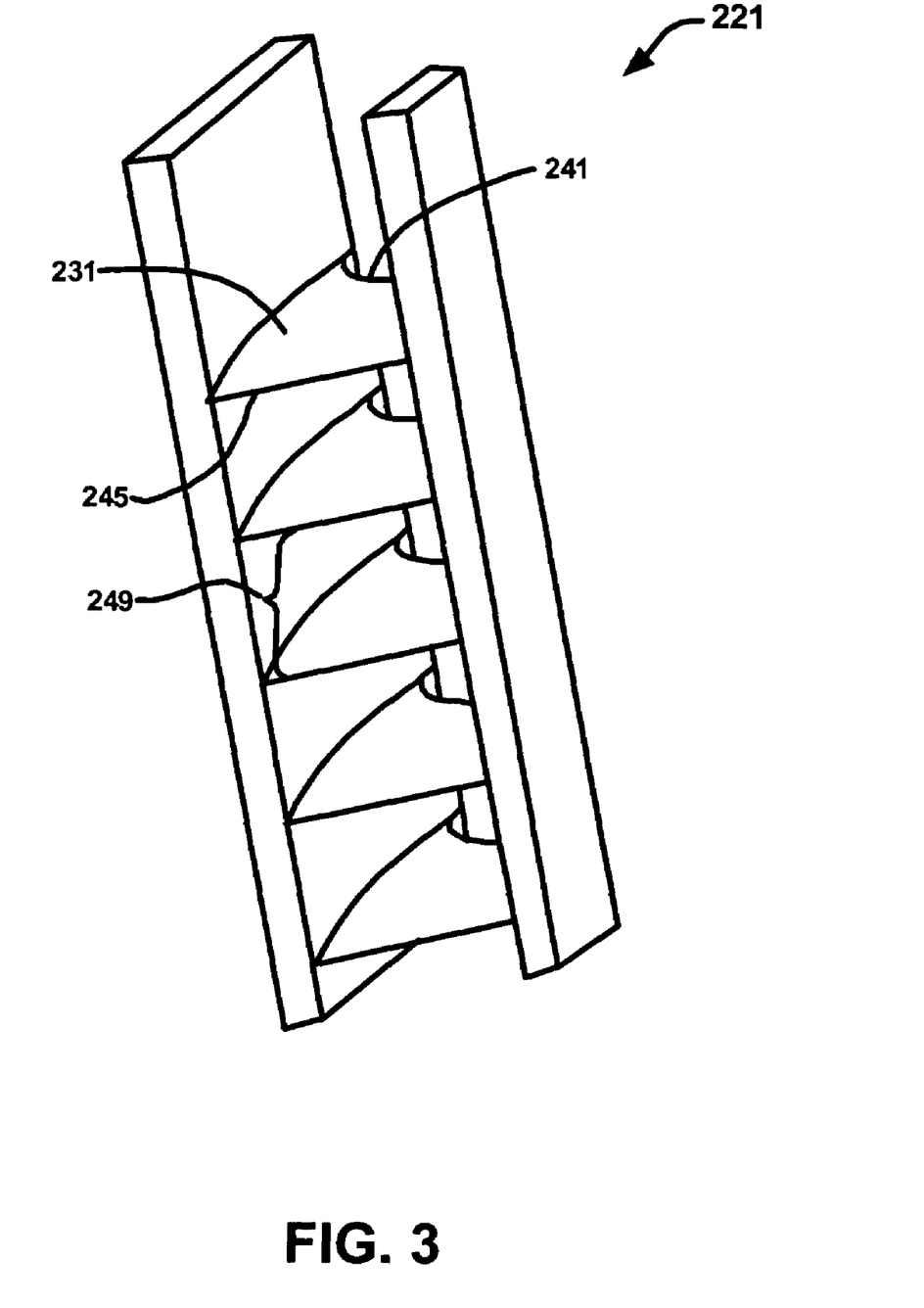
FIG. 3 is a rear isometric view of the diffuser of FIG. 2 in accordance with one embodiment of the present invention.

As shown in FIGS. 2-4, the tapers on the airfoils 231 of the diffuser 221 are smooth and edge-free from the leading edges 241 to the trailing portions 245. Alternatively, the tapers may be configured with linear tapers. The airfoils 231 of the contraction/filter device 500/600 may be provided with similar smooth and edge-free tapers extending from their respective leading edges 253 to their respective trailing edges 251. In addition, the trailing portions 245 of the airfoils 231 of the diffuser 221 and the leading edges 253 of the airfoils 223 of the contraction 223 have linear edges that are substantially perpendicular to the directions of the air flow at the downstream and upstream sides 213, 215, respectively, of the disk pack or disks 115. Furthermore, the leading edges 253 of the airfoils 231 of the contraction/filter device 500/600 are preferably rounded, as shown in FIGS. 5 and 6.

The present invention has several advantages, including the ability to streamline airflow in a hard disk drive. The airflow is smoothed into the bypass channel with a stationary afterbody. The diffuser provides a gradual expanding passage so that the speed of the airflow can gradually decrease and the pressure can rise. This design reduces losses in system momentum due to sudden expansion of the air or gas in the drive, and ensures a smooth recovery of pressure from kinetic energy in the entering flow field. As a result, the amount of power required by the spindle motor is reduced. Alternatively, airflow moving toward the disk pack is contracted to allow efficient energy conversion from pressure energy to kinetic energy prior to merging of the bypass airflow with the airflow among the disks.

Single Piece Airflow Contractor and Filter

With reference now to FIG. 5, a front isometric view of a contraction and filter structure 500 with a removable filter 540 is shown in accordance with one embodiment of the present invention. In one embodiment, the contraction and filter structure 500 is manufactured from a single piece. For example, the structure 500 may be molded, injected, formed, fabricated and/or milled. Additionally, the structure 500 may be metal, plastic and/or composite. It is appreciated that the structure 500 is a single piece which includes both a contraction portion 223 and a filter portion 520.

In one embodiment, contraction portion 223 includes a number of airfoils 231 which are at least one more in number than the number of disks utilized by the hard drive. For example, if the hard drive has a single disk, there would be a first airfoil 231 below the disk and a second airfoil 231 above the disk. Thus, the airflow is delivered in equilibrium to both sides of the disk. This equal delivery method ensures that the disk does not encounter turbulence due to differing air pressures around the disk.

In one embodiment, filter portion 520 includes a number of filter vents 510 equal to that of the number of airfoils 231. Therefore, the first portion of the airflow that increases speed as it passes through the airfoil 231 can draw the second portion of the airflow through the filter vents 510. That is, since the airflow is increased as it is passed through the contraction portion 223, it draws additional airflow through the filter portion 520. The "drawing of airflow" operation is well known in the Aerodynamic field, specifically with respect to flow through a Venturi.

Filter portion 520 also includes a removable and/or adjustable filter 540. In general, the removable and/or adjustable filter 540 allows the filter 540 to be adjusted based on particle matter in the airflow. For example, when the drive is new, the filter 540 is set to full operational strength to capture any possible particles resulting from manufacture or initial operation. However, as the drive is used, the filter 540 may be adjusted (manually or automatically) to reduce its filtering strength thereby reducing the impedance to the airflow. This reduction of filter strength, and therefore impedance to the airflow, will result in less power consumption for the hard disk drive. In one embodiment, the contraction 223 incorporates electrical charges to filter the air flowing through it. In another embodiment, the efficacy of the filtration material may be enhanced, for example, by incorporation of electric charges (electret).

In another embodiment, due to the replacement potential of the filter 540 a more efficient filter material with a shorter life span may be used. That is, since the filter 540 is replaceable, the filter material can be tailored toward better performance with less regard for longer life span. In one embodiment, the filter portion 520 and/or filter 540 also includes a sensor for automatically adjusting the filter porosity based on a variety of measurements including: the particle interception of the filter, the operation of the arm, or the like.

In one embodiment, structure 500 also includes an alignment portion 530 for correctly aligning the structure 500 with respect to the bypass channel 219 such that the airflow is smoothly passed from the bypass channel 219 through the structure 500 and into the upstream side 215 of the disk pack or disks 115.

Referring now to FIG. 6, a front isometric view of the contraction and filter structure 600 having a permanent filter 640 is shown in accordance with one embodiment of the present invention. That is, the contraction and filter structure 600 is similar to the contraction and filter structure 500 except that the filter 640 of filter portion 620 is permanently fixed. For example, in one embodiment, the filter 640 is non-adjustable and non-removable. In another embodiment, the filter 640 is adjustable for permeability but is not removable. Therefore, the filter 640 may have an adjustable permeability that is adjusted manually and/or automatically, but it is not removable or replaceable. Therefore, the filter 640 may be adjusted for airflow purposes, but it is not able to utilize higher efficiency lower life span technology as that which may be utilized by filter 540 of FIG. 5.

Additionally, contraction and filter structure 600 illustrates the path of the disk(s) 115 with dotted lines, and further illustrates the path of the airflow with solid arrows 225. Typically, each contraction element 615 is vertically aligned with the disk edge 115. Thus, 618 in FIG. 6 is equal to the disk thickness. However, it is also possible to increase or decrease the size of 618 which will affect the airflow characteristics through contraction. The vent thickness 622 utilized by the filter portion 620 can have a wide variety of ranges. In one embodiment, thickness 622 is equal to 618. However, in another embodiment, thickness 622 is larger than 618 thereby reducing filter vent 510 size thus offering less disruption to the shroud wall. In some cases, a narrower filter vent 510 works well because the flow through the filter portion 620 will be much smaller than through the contraction portion 223. In another embodiment, the increase in thickness 622 should be symmetric about the disk 115.

Therefore, in one embodiment, the airflow first passes through the contraction portion 223 and then draws the air through the filter portion 620 (e.g., filter vents 510) as it re-encounters the disk(s) 115. In so doing, the higher speed airflow (e.g., the airflow through the contractor portion 223) encounters the disk first in a laminar flow manner thereby reducing vibration.

Moreover, the filtered air (that is moving at a slower rate) is accelerated to speed by the airflow passing through the contractor portion 223 utilizing the Venturi effect and therefore also produces little or no turbulence. That is, by drawing the slow moving air (e.g., the airflow through filter portion 640) with the fast moving air (e.g., the airflow through the contractor portion 223) the turbulence created by the filter portion 640 becomes negligible. Thus, instead of the filter portion 640 being directly in the airflow and generating a turbulent flow, laminar flow is sustained while utilizing a filter portion 640 to filter the airflow.

Figure 7:
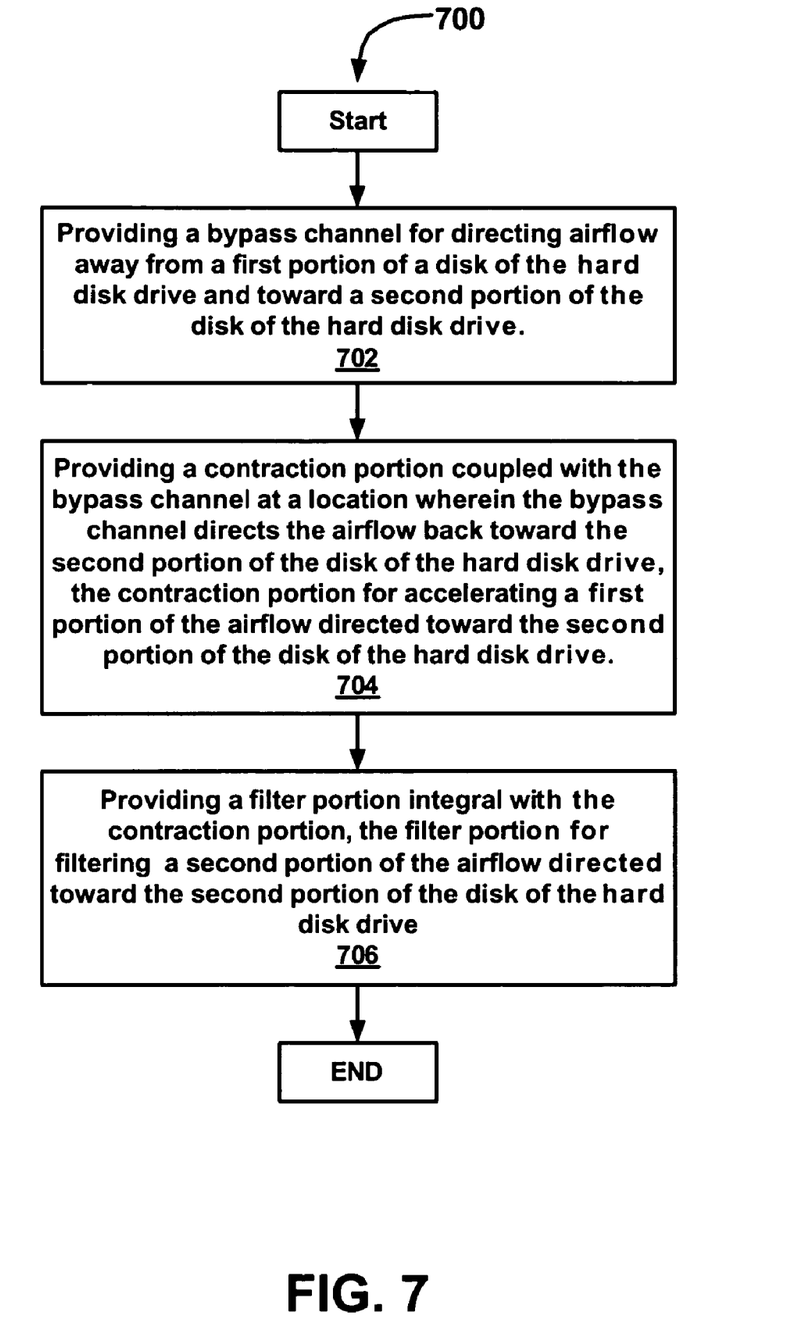
FIG. 7 is a flowchart of a method for guiding bypass reentry flow through contraction and filter for a hard disk drive in accordance with one embodiment of the present invention.

With reference now to FIG. 7, a flowchart 700 of a method for guiding bypass reentry flow through contraction and filter for a hard disk drive is shown in accordance with one embodiment of the present invention. That is, a bypass channel is branched for purposes of both increasing the speed of the airflow as it reencounters the disk 115 and also for filtering the airflow while saving a filter interruption into the shroud.

With reference now to step 702 of FIG. 7, one embodiment provides a bypass channel for directing airflow away from a first portion of a disk of the hard disk drive and toward a second portion of the disk of the hard disk drive. As shown in FIG. 1 and described in detail herein, a diffuser 221 is utilized to initially separate the airflow from the first portion of the disk 115 (e.g., downstream side 213) and direct it down a bypass channel 219 toward a second portion of the disk 115 (e.g., the upstream side 215). In the embodiment shown, the bypass channel 219 is located between an outer perimeter 217 (FIG. 1) of the housing 113 and the actuator 121, such that the bypass channel 219 completely circumscribes the actuator 121.

In some hard disk drive designs where there is not sufficient space to implement a full bypass channel (shown) the bypass channel 219 may be interrupted (not shown). This is known as a partial bypass. When there is a partial bypass, the presence of a diffuser and contraction remains beneficial. Furthermore, in order to help the bypass flow negotiate substantial angular changes (channel bends), one or more turning vanes may be placed in those areas. The use of turning vanes is well known in wind tunnel design.

Referring now to step 704 of FIG. 7, one embodiment provides a contraction portion 223 (e.g., a Venturi portion) coupled with the bypass channel 219. For example, the contraction portion 223 is at a location wherein the bypass channel 219 directs the airflow back toward the second portion (e.g., the upstream side 215) of the disk 115 of the hard disk drive 111. As stated herein, the contraction portion 223 is used for accelerating a first portion of the airflow directed toward the second portion of the disk of the hard disk drive. That is, the contraction portion 223 reduces the channel width from entrance to exit, thereby increasing the flow rate of the air while also reducing the pressure of the air. The acceleration of the airflow allows the bypassed stream of air to enter back into contact with the disk at, or close to, the operating speed of the disk. This acceleration of the airflow provides the reintroduction of the airflow in a laminar state of flow instead of a turbulent state. By maintaining the laminar flow, vibration to the disk and other hard disk drive components are significantly reduced.

With reference now to step 706 of FIG. 7, one embodiment provides a filter portion 620 integral with the contraction portion 223. That is, in one embodiment, the filter portion and the contraction portion are a single component. The filter portion 620 for filtering a second portion of the airflow directed toward the second portion (e.g., the upstream side 215) of the disk 115 of the hard disk drive 111. As stated herein, by utilizing a branched bypass channel the speed of the airflow can be increased before it reencounters the disk 115 (e.g., the contraction portion 223). Additionally, the airflow can be filtered without interrupting the airflow in the shroud. Moreover, since the airflow is filtered just before it reencounters the disk 115, any particles are filtered prior to their causing harm to the disk or other hard disk drive components.

Therefore, since the bypass channel is branched at the contraction and filter structure (e.g., 500 or 600), the filter 540 or 640 is not disrupting the entire airflow but is instead filtering only a portion of the airflow which is then drawn up to speed (e.g., via a suction produced by the contraction portion 223) by the other portion of the airflow passing through the contraction portion 223. For example, the airflow passing through the contraction portion 223 does not pass through the filter portion, and the airflow passing through the filter portion does not pass through the contraction portion 223.

Thus, embodiments of the present invention provide, a method and system for guiding bypass reentry flow through contraction and filter for a hard disk drive. Additionally, embodiments provide a method and system for guiding bypass reentry flow through contraction and filter for a hard disk drive which provides the filtering of the air without causing interference with the airflow around the disk.

Embodiments of the present invention further provide reduced turbulence and vibration of the disk caused by disruptions in the airflow around the disk during operation.

While the method of the embodiment illustrated in flow chart 700 shows specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method and system for guiding bypass reentry flow through contraction and filter for a hard disk drive, is thus described. While the present invention has been described in particular embodiments, it should be appreciated that the present invention should not be construed as limited by such embodiments, but rather construed according to the below claims.

What is claimed is:

1. A method for guiding bypass reentry flow through contraction and filter in a hard disk drive comprising:
   providing a bypass channel for directing airflow away from a first portion of a disk of the hard disk drive and toward a second portion of the disk of the hard disk drive, said bypass channel branching said airflow into a first portion and a second portion;
   providing a contraction portion coupled with the bypass channel at a location wherein the bypass channel directs the airflow back toward the second portion of the disk of the hard disk drive, said contraction portion accelerating said first portion of the airflow directed toward the second portion of the disk of the hard disk drive, wherein the first portion of the airflow passing through the contraction portion does not pass through a filter; and
   providing a filter portion integral with the contraction portion, said filter portion filtering said second portion of the airflow directed toward the second portion of the disk of the hard disk drive.

2. The method as recited in claim 1 wherein the second portion of the airflow passing through the filter portion does not pass through the contraction portion.

3. The method as recited in claim 1 wherein said providing a filter portion further comprises: providing a removable filter for filtering particles out of said airflow.

4. The method as recited in claim 1 wherein said providing a filter portion further comprises:
   providing an adjustable filter for filtering particles out of said airflow, wherein said adjusting allows said filter to be more or less permeable.

5. The method as recited in claim 1 wherein the contraction portion is located closer to the second portion of the disk of the hard disk drive than the filter portion.

6. The method as recited in claim 1 wherein the first portion of the airflow passing through the contraction portion provides a suction such that the second portion of the airflow is drawn through the filter portion.

7. An airflow contractor and filter comprising:
   a contraction portion accelerating a first portion of an airflow to a disk of a hard disk drive; the first portion of the airflow passing through the contraction portion does not pass through a filter; and
   a filter portion integral with the contraction portion, said filter portion filtering a second portion of the airflow to the disk of the hard disk drive wherein the second portion of the airflow passing through the filter portion does not pass through the contraction portion.

8. The airflow contractor and filter of claim 7 wherein the filter portion further comprises:
   a removable filter for filtering particles out of said airflow.

9. The airflow contractor and filter of claim 7 wherein the filter portion further comprises: an adjustable filter that can be more or less permeable.

10. The airflow contractor and filter of claim 7 wherein the contraction portion is located closer to the disk of the hard disk drive than the filter portion.

11. The airflow contractor and filter of claim 7 wherein the first portion of the airflow passing through the contraction portion provides a suction such that the second portion of the airflow is drawn through the filter portion.

12. A hard disk drive comprising:
   a housing;
   a disk pack mounted to the housing and having a plurality of disks that are rotatable relative to the housing, the disk pack defining an axis of rotation and a radial direction relative to the axis, and the disk pack having a downstream side wherein air flows away from the disks, and an upstream side wherein air flows toward the disks;
   an actuator mounted to the housing and being movable relative to the disk pack, the actuator having a plurality of heads for reading data from and writing data to the disks;
   a bypass channel formed in the housing for directing the air flows generated by rotation of the disks from the downstream side of the disk pack to the upstream side of the disk pack, said bypass channel branching said air flows into a first portion and a second portion; and
   an airflow contractor and filter comprising:
      a contraction portion accelerating said first portion of the air flows to the upstream side of the disk pack, wherein the first portion of the air flows passing through the contraction portion does not pass through a filter portion; and
      a filter portion integral with the contraction portion, said filter portion filtering said second portion of the air flows to the upstream side of the disk pack.

13. The hard disk drive of claim 12 wherein the second portion of the airflow passing through the filter portion does not pass through the contraction portion.

14. The hard disk drive of claim 12 wherein the filter portion further comprises:
   a removable filter for filtering particles out of said airflow.

15. The hard disk drive of claim 12 wherein the filter portion further comprises:
   an adjustable filter that can be more or less permeable.

16. The hard disk drive of claim 12 wherein the contraction portion is located closer to the disk of the hard disk drive than the filter portion.

17. The hard disk drive of claim 12 wherein the first portion of the airflow passing through the contraction portion provides a suction such that the second portion of the airflow is drawn through the filter portion.

* * * * *